United States Patent
Czapla et al.

(10) Patent No.: US 9,269,334 B2
(45) Date of Patent: Feb. 23, 2016

(54) DISPLAY SYSTEM

(71) Applicant: DisplayLink (UK) Limited, Cambridge (GB)

(72) Inventors: Piotr Czapla, Bedzin (PL); Sebastian Matysik, Ruda Slaska (PL)

(73) Assignee: DISPLAYLINK (UK) LIMITED, Mount Pleasant, Cambridge (GB)

( * ) Notice: Subject to any disclaimer, the term of this patent is extended or adjusted under 35 U.S.C. 154(b) by 0 days.

(21) Appl. No.: 14/401,083

(22) PCT Filed: May 15, 2013

(86) PCT No.: PCT/GB2013/051252
§ 371 (c)(1),
(2) Date: Nov. 13, 2014

(87) PCT Pub. No.: WO2013/171487
PCT Pub. Date: Nov. 21, 2013

(65) Prior Publication Data
US 2015/0138217 A1    May 21, 2015

(30) Foreign Application Priority Data

May 15, 2012    (GB) .................... 1208501.5

(51) Int. Cl.
*G06F 13/00*    (2006.01)
*G09G 5/00*    (2006.01)
*G09G 5/39*    (2006.01)
*G06F 3/14*    (2006.01)
*G09G 5/395*    (2006.01)

(52) U.S. Cl.
CPC .............. *G09G 5/39* (2013.01); *G06F 3/1431* (2013.01); *G09G 5/006* (2013.01); *G09G 5/395* (2013.01); *G09G 2360/12* (2013.01); *G09G 2360/18* (2013.01)

(58) Field of Classification Search
None
See application file for complete search history.

(56) References Cited

U.S. PATENT DOCUMENTS 7,034,777 B1 * 4/2006 McLarty et al. ............... 345/2.2
2007/0236407 A1 10/2007 Toorians
(Continued)

FOREIGN PATENT DOCUMENTS

GB    2478583 A    9/2011
WO    2012096967 A1    7/2012

OTHER PUBLICATIONS

Search Report for corresponding GB Appl. No. 1208501.5 dated Aug. 16, 2012.
(Continued)

*Primary Examiner* — Jacinta M Crawford (57) ABSTRACT

A display system comprises a processing device connected to a plurality of display devices, the processing device comprising a processor connected to a system memory and to a graphics processing unit, the graphics processing unit comprising a graphics processor connected to a video memory. A method of operating the system comprises the steps of maintaining a system frame buffer in system memory, creating a shared primary surface in video memory for an additional display device not controlled by the graphics processing unit, rendering the contents of the system frame buffer onto the shared primary surface, rendering any and all directly rendered applications onto the shared primary surface, maintaining a second frame buffer in system memory, copying at least some of the content of the shared primary surface to the second frame buffer, and outputting at least some of the content of the second frame buffer to the additional display device.

8 Claims, 5 Drawing Sheets

(56) References Cited

U.S. PATENT DOCUMENTS

2010/0100690 A1* 4/2010 Rajamani et al. ............ 711/152
2010/0293504 A1* 11/2010 Hachiya ....................... 715/806
2012/0086717 A1 4/2012 Liu

OTHER PUBLICATIONS

International Search Report and Written Opinion for corresponding PCT/GB2013/051252 mailed Jul. 16, 2013.

* cited by examiner

DISPLAY SYSTEM

RELATED APPLICATIONS

This application claims the benefit of both International Patent Application No. PCT/GB2013/051252, filed on May 15, 2013, and United Kingdom Patent Application No. 1208501.5, filed on May 15, 2012, both of which are incorporated by reference herein.

TECHNICAL FIELD

This invention relates to a method of operating a display system. In one embodiment, the method can be used to access display content composed with GPU accelerated graphics in basic mode.

BACKGROUND

In desktop computing, it is now common to use more than one display device. Traditionally, a user would have a computer with a single display device attached, but now it is possible to have more than one display device attached to the computer, which increases the usable display area for the worker. For example, International Patent Application Publication WO 2007/020408 discloses a display system which comprises a plurality of display devices, each displaying respectively an image, a data processing device connected to each display device and controlling the image displayed by each display device, and a user interface device connected to the data processing device. Connecting multiple display devices to a computer is a proven method for improving productivity.

The connection of an additional display device to a computer presents a number of problems. In general, a computer will be provided with only one video output such as a VGA-out connection. One method by which a second display device can be added to a computer is by physically adding an additional graphics card to the internal components of the computer. The additional graphics card will provide an additional video output which will allow the second display device to be connected to the computer. However, this solution is relatively expensive and is not suitable for many non-technical users of computers.

An alternative method of connecting the second display device is to connect the additional display device to a USB socket on the computer, as all modern computers are provided with multiple USB sockets. This provides a simple connection topology, but requires additional hardware and software to be present, as in general, USB has a bandwidth that makes the provision of a good quality video output a non-trivial task. It is also desirable that any additional hardware between the computer and the display device is kept as simple as possible. This means that when connecting an additional display device using a limited bandwidth technology such as USB, certain complex tasks can be difficult to achieve.

In particular, complexity in many modern operating systems can make it difficult to support additional display devices. An operating system can be deployed on a wide variety of end computers with very different hardware capabilities, so it is common for some features within the operating system to be optional or to have different alternatives designed to suit different computing hardware. For example, in Windows® operating systems, a number of different display modes are supported, depending upon the capability of the graphics processing unit that is available on the computer that is running the operating system. The lowest level is commonly referred to as a "basic mode video" and more complex modes are also supported.

Third parties who provide hardware and/or software that will provide display functionality must ensure that their display solutions will work with all of the display modes that are provided within such operating systems. In particular, it is not sufficient to provide a display solution that only works with the default mode (usually the most advanced), the solution must also work with basic mode video. An example of such a display solution is the provision of an additional monitor for a computer that can be connected to the computer via a USB socket rather than a conventional VGA socket, as discussed above. Such an additional monitor will consist of hardware connections and software controlling the additional monitor and these must work even if the computer is running basic mode video. Since the basic mode operates in certain restrictive ways with respect to the creation and transmission of display data within the operating system, it is essential that any third party display solutions are still able to fully function, even in light of these restrictions of the basic mode.

SUMMARY

It is therefore an object of the invention to improve upon the known art.

According to a first aspect of the present invention, there is provided a method of operating a system comprising a processing device connected to a plurality of display devices, the processing device comprising a processor connected to a system memory and to a graphics processing unit, the graphics processing unit comprising a graphics processor connected to a video memory, the method comprising the steps of maintaining a system frame buffer in system memory, creating a shared primary surface in video memory for an additional display device not controlled by the graphics processing unit, rendering the contents of the system frame buffer onto the shared primary surface, rendering any and all directly rendered applications onto the shared primary surface, maintaining a second frame buffer in system memory, copying at least some of the content of the shared primary surface to the second frame buffer, and outputting at least some of the content of the second frame buffer to the additional display device.

According to a second aspect of the present invention, there is provided a system comprising a processing device connected to a plurality of display devices, the processing device comprising a processor connected to a system memory and to a graphics processing unit, the graphics processing unit comprising a graphics processor connected to a video memory, the system arranged to maintain a system frame buffer in system memory, create a shared primary surface in video memory for an additional display device not controlled by the graphics processing unit, render the contents of the system frame buffer onto the shared primary surface, render any and all directly rendered applications onto the shared primary surface, maintain a second frame buffer in system memory, copy at least some of the content of the shared primary surface to the second frame buffer, and output at least some of the content of the second frame buffer to the additional display device.

As is known, for example from http://www.itlisting.org/4-windows-ce-embedded/f660c51f5d3c3031.aspx, a surface of a video memory is usually simply a frame buffer that the display controller uses to put pixels to the display screen. A primary surface is a surface that is currently visible on a display device as opposed to non-primary surfaces, which are usually called off-screen buffers. The primary surface is what the Windows® desktop is drawn to. It is an encapsulation of the frame buffer, or the GDI's view of the frame buffer. A primary surface is created so that GDI can draw to the display screen. It is generally created when a device boots up, and is created by the display driver. Display memory and video memory are generally used interchangeably, and refer to the memory attached to the display device (not system RAM). A DIB (device independent bitmap) is a representation that will look the same on all devices, where as a DDB (device dependant bitmap) may look different, even if the bitdepths are the same. Generally, one device may order colors differently, or something like that, so that a DDB cannot be transferred to another device (bit for bit) and have the same resulting image. A DIB can be transferred (bit for bit) to another device and the images will look the same.

A shared primary surface is a surface that can be accessed directly by multiple applications. Thus, sharing a surface means that a surface can be opened and accessed by an application that does not own the surface. An application that owns the surface must tell an operating system to allow sharing when the surface is created.

Owing to the invention, it is possible to provide a display system that employs a method that allows the graphics processing unit (GPU) to create additional shared primary surfaces for extra displays such as USB connected screens. This allows the processing device to access GPU accelerated content in basic rendering mode of Microsoft® Windows® operating systems and to send the generated content in real-time to any interested party such as an externally connected screen. The solution does not lead to problems with composing accelerated and non-accelerated screen content. The driver for the GPU creates a shared primary surface for use for additional displays, the driver operating as it would normally in the case of a screen that driver is aware of, and is managing. This allows the use of regular rendering paths of the operating system, at the cost of slightly higher GPU resource consumption. The processing device is now allowed to create a real allocation for an additional display, and will use the GPU driver to present on a surface that relates to the additional display.

In a preferred embodiment, the processing device can get information about changes on displays using an additional kernel mode driver, which can send such information to a user mode helper application. In the user mode helper application, it is able to intercept user mode handles to the extra surfaces (as well as to surfaces representing displays connected to the built-in GPU). Then, based on the information about changes to the screen and having a handle that represents it in user mode, the application is able to copy content to any interested party. The content being accessed is already composited by the operating system with both non-accelerated and GPU-accelerated resources (i.e., GDI and DirectX®). The method is agnostic about where the screen contents being accessed are copied and the medium being used to achieve it.

Advantageously, "dirty" rectangles describing regions of displays that change are determined in the kernel mode driver, and if they relate to additional displays they are pushed to the helper application residing in user mode. This is sent when GPU completes blit operation. The user mode helper application is a DirectX9 application. As such, it is required to load a user mode driver component (UMD). It is then used to create Dx9Devices for each display in order to get access to their primary surfaces. These devices must be recreated when there is a change in the system that leads to the destruction and recreation of shared primary surfaces (for example a screen resolution or layout change). From this point, the helper application is able to copy the content of resources that represent screens in the system, based on the information it receives from kernel mode driver, and the handle information it keeps. The user mode application can then use the data and deliver it to other parts of the system, for example to display on a monitor that is connected over a USB connection.

It will be appreciated that an additional display device not controlled by the GPU is a display device not connected to any of the video outputs (e.g. VGA, HDMI, DVI) of the GPU. Instead it is connected to the processing device. Such display device is therefore controlled by the processing device and is not controlled by the GPU. A directly rendered application is an application that is rendered directly into video memory (typically to an off-screen buffer and then is copied by an operating system to a primary surface). A non-directly rendered application is one that renders to system memory first and then is copied by an operating system to a primary surface (which is in video memory). The arrangement between an operating system, the GPU, and the processing device is that:

a. The kernel mode driver that corresponds to the processing device instructs the GPU to create a primary surface in the GPU memory for use for additional display controlled by the processing device;

b. The kernel mode driver instructs an operating system to use the primary surface mentioned above in regular rendering paths while rendering to the additional display controlled by the processing device;

c. An operating system communicates to the GPU which areas of the primary surface changed at any given moment; and d. The kernel mode driver intercepts such communication to know which areas of the additional display device controlled by the processing device are to be updated.

BRIEF DESCRIPTION OF THE DRAWINGS

Embodiments of the present invention will now be described, by way of example only, with reference to the accompanying drawings, in which:—

DETAILED DESCRIPTION

Figure 1:
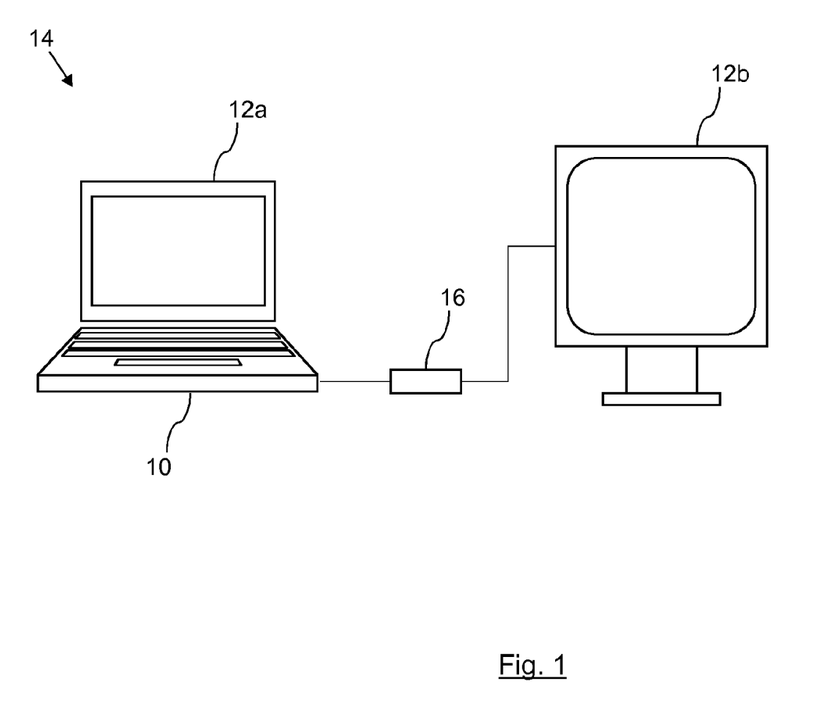
FIG. 1 is a schematic diagram of a system using two display devices.

FIG. 1 shows a processing device 10 that is connected to two display devices 12. The processing device 10 is the processing part of a conventional laptop computer 14 that is connected to a primary display device 12a. In addition, the processing device 10 is also connected to an additional display device 12b, which is an external monitor 12b. The monitor 12b is connected to the laptop 14 via a USB connection through an adaptor 16. The processing device 10 controls the images that are shown on the display devices 12. The purpose of the arrangement shown in FIG. 1 is to take advantage of the extra display area provided by the display device 12b in order to increase the available display area for a user.

The hardware 16 that is connected to the USB port of the laptop 14 is a device with a purpose-built chip, which can be an adapter or a docking station. A monitor that supports a direct USB connection can be used if it has the necessary chip built-in. Any additional monitor that a user wishes to connect to their laptop 14 is simply connected through a suitable device 16 with the necessary chip and therefore there is no extra graphics adapter required in the laptop 14, nor any other resource such as additional CPU, GPU or memory, etc. The adaptor 16 provides the necessary hardware and software to be able to utilise a USB output from the laptop 14 for the purpose of showing high-resolution graphics (including video) on an additional monitor 12b. On the output side of the adaptor 16, a VGA output can be provided to connect to the standard VGA socket provided on the display device 12b.

The additional display device 12b can be controlled to show exactly the same image that is being shown by the primary display device 12a. However, the greatest advantage for the user can be achieved by controlling the two display devices 12a and 12b in order that they show different images. The user's desktop can be split, so that the left half is shown by the primary display device 12a and the right half can be shown by the additional display device 12b. The user can navigate between the two display devices 12b as if they were a single continuous display device. For example, the user can move an on-screen cursor "off" one display device and "onto" the other display device, in an intuitive fashion. Application windows can be moved around the desktop without limitation.

Figure 2:
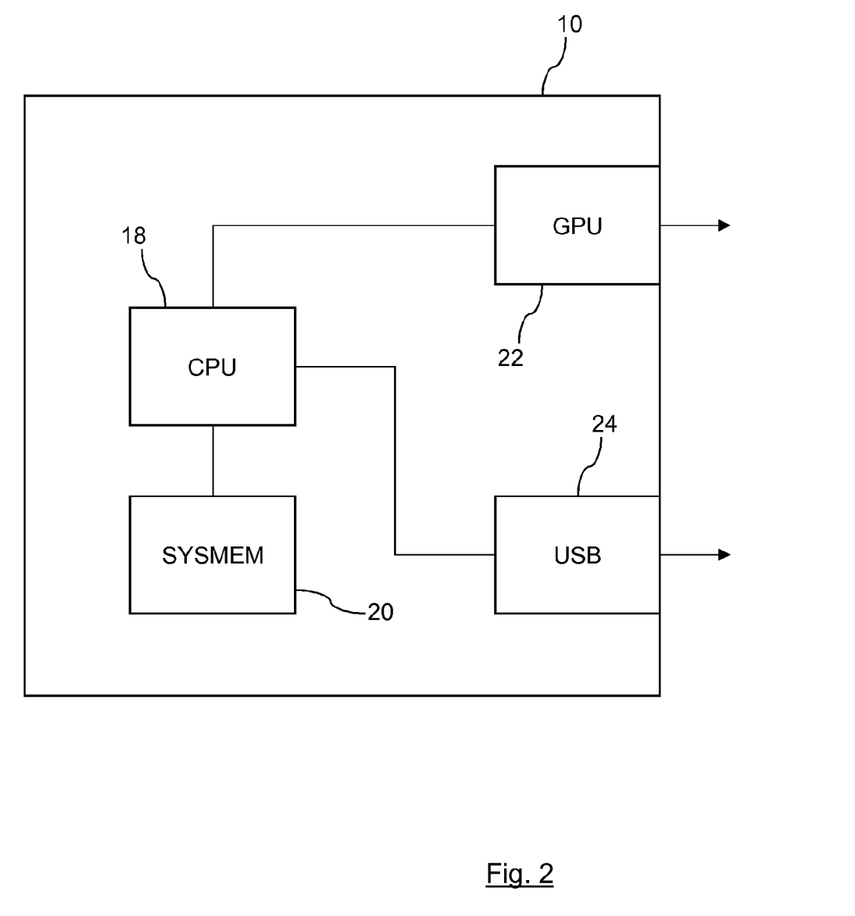
FIG. 2 is a schematic diagram of a processing device.
Figure 3:
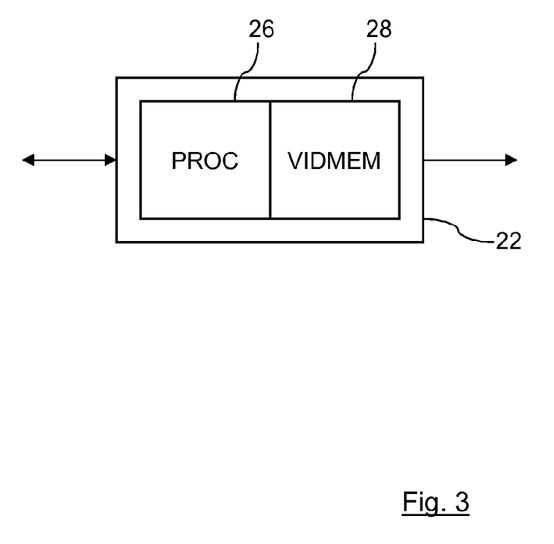
FIG. 3 is a schematic diagram of a graphics processing unit.

FIG. 2 shows more detail of the processing device 10. Various internal components of the processing device 10 are shown, but it will be appreciated that a large number of additional components have been omitted for reasons of clarity. The processing device 10 comprises a processor 18 that is connected to a system memory 20 and to a graphics processing unit 22. The processor 18 is also connected to a USB hub 24. The graphics processing unit 22 comprises a graphics processor 26 connected to a video memory 28 (shown in FIG. 3) and has an external VGA connection which is used to drive the primary display device 12a. Through the USB hub 24, the processor 18 is driving the additional display device 12b. In this way, an additional display device 12b can be controlled, through the adaptor 16, without needing an additional GPU in the laptop 14.

Traditionally, the only way to add an additional display device to a standard desktop computer or laptop computer was to physically install an additional GPU in the computer, which would provide an additional VGA out connection, to which the additional display device could be connected. In the system shown in FIGS. 1 and 2, no additional hardware is required in the laptop 14 to connect and operate the additional display device 12b from the laptop 14, as virtually all laptops and desktop computers are provided with multiple USB connections (commonly 4, 6 or 8). However, this arrangement creates greater processing demand, as USB is a bandwidth limited connection protocol that was not designed for the heavy graphics that is common in today's desktop computing. For example, the provision of acceptable quality real-time video over USB is a non-trivial task.

Figure 4:
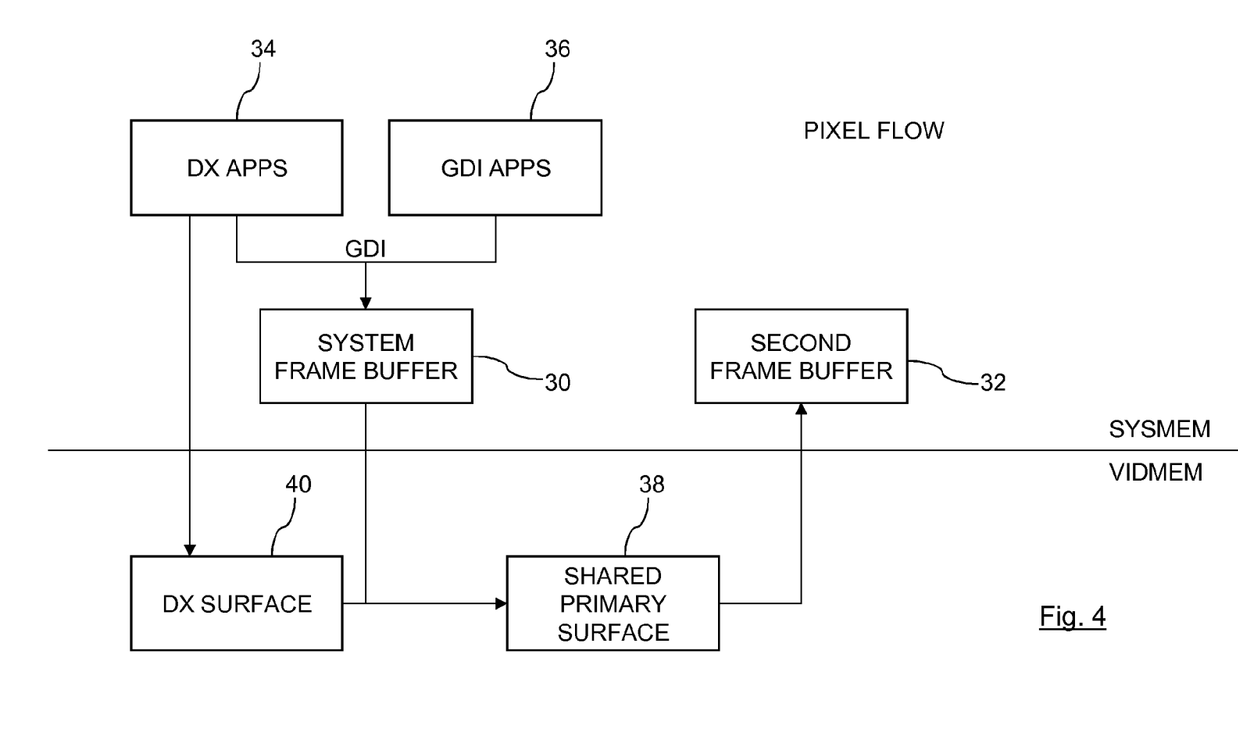
FIG. 4 is a schematic diagram of a pixel flow in the processing device of FIG. 2.

It is also the case that the complexity of the operating system being used by the processing device 10 can make it difficult to access and process the necessary pixel data to be used for the images to be displayed by the two display devices 12. FIG. 4 shows how the components of the processing device 10 are configured in order that pixel data can be accessed correctly in different display modes. The system memory maintains a system frame buffer 30 and a second frame buffer 32. The system frame buffer 30 stores components of the desktop image such as background image (wallpaper) and the task bar (often pinned to the bottom of the desktop). DirectX applications 34 and GDI applications 36 will write image data into the system frame buffer 30. The second frame buffer 32 is used to control the additional display device 12b.

The video memory 26 of the graphics processing unit 22 has a shared primary surface 38 created in the memory for the additional display device 12b that is not controlled by the graphics processing unit 22. In this way, processing and memory functions of the GPU 22 can be harnessed for the benefit of the image to be displayed by the additional display device 12b, while conventional rendering paths can be used so that the normal operation of the operating system is not disturbed. The directX applications 34 render through a DX surface 40 onto the shared primary surface 38 and this surface 38 can be accessed in order to get the pixel data into the second frame buffer 32, for ultimate display on the additional display device 12b.

Figure 5:
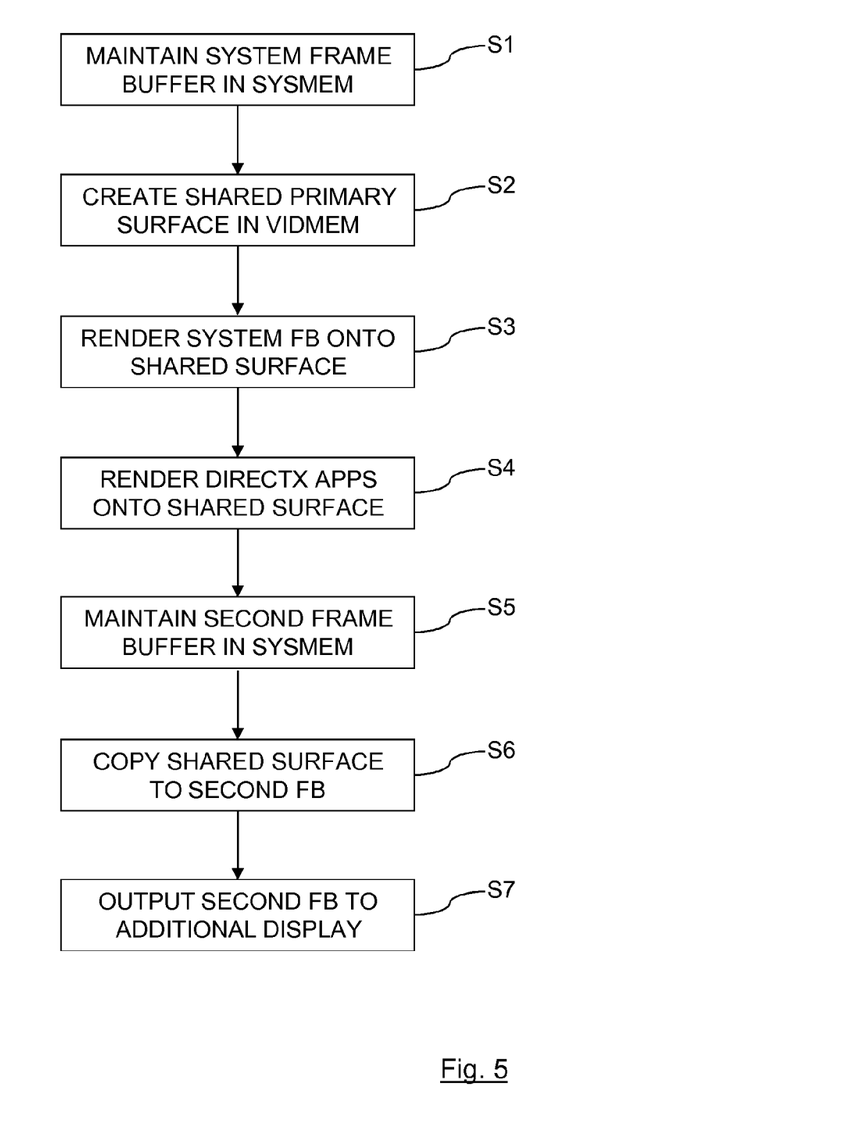
FIG. 5 is a flowchart of a method of operating the display system.

The method of operating the display system is summarised in FIG. 5. The method comprises the steps of maintaining the system frame buffer 30 in system memory 20 (step S1), creating a shared primary surface 38 in video memory 28 for an additional display device 12b not controlled by the graphics processing unit 22 (step S2), rendering the contents of the system frame buffer 30 onto the shared primary surface 38 (step S3), rendering any and all directly rendered applications 34 onto the shared primary surface 38 (step S4), maintaining a second frame buffer 32 in system memory 20 (step S5), copying at least some of the content of the shared primary surface 38 to the second frame buffer 32 (step S6), and outputting at least some of the content of the second frame buffer 32 to the additional display device 12b (step S7).

The pixel data being stored in the shared primary surface 38 does not have to be used to constantly refresh the second frame buffer 32. Only those pixels that have changed in the shared primary surface 38 need to be sent to the second frame buffer 32. In a similar fashion, only those pixels that have changed in the second frame buffer 32 need to be outputted via the USB connection through the adaptor 16 to the additional display device 12b. This creates efficiency in the bandwidth used, but provides the end result of adding a further display device 12b that can be controlled by the desktop computer 10 over a USB connection, while utilising some of the processing and storage capabilities of the GPU 22 in such a way that the normal rendering paths within the operating system are used. The entire pixel flow, i.e. copying between the surface, buffers and to the external device 12b is all happening in real-time.

What is claimed is:

1. A method of operating a system comprising a processing device connected to a plurality of display devices, the processing device comprising a processor connected to a system memory and to a single graphics processing unit, the graphics processing unit comprising a graphics processor connected to a video memory for storing image data to be output to a first display device directly connected to the graphics processing unit, the method comprising the steps of:

maintaining a system frame buffer and a second frame buffer in the system memory, the system frame buffer storing at least background image data, and the second frame buffer storing image data for outputting to a second display device not directly connected to the graphics processing unit;

creating a primary surface in the video memory of the graphics processing unit;

copying contents of the system frame buffer onto the primary surface of the video memory;

rendering any and all directly rendered applications to be displayed on the second display device onto the primary surface of the video memory;

copying at least some of the content, including at least some of the rendered applications, of the primary surface to the second frame buffer in the system memory, and outputting at least some of the content, including at least some of the rendered applications, of the second frame buffer in the system memory to the second display device.

2. A method according to claim 1, and further comprising locking the primary surface of the video memory, prior to the step of copying at least some of the content, including at least some of the rendered applications, of the primary surface of the video memory to the second frame buffer, and unlocking the primary surface of the video memory afterwards.

3. A method according to claim 1, and further comprising running a kernel mode driver in system memory, the kernel mode driver arranged to intercept communications between an operating system and the graphics processing unit.

4. A method according to claim 3, and further comprising running a user mode helper application in system memory, the user mode helper application connected to the kernel mode driver and arranged to perform the step of outputting at least some of the content, including at least some of the rendered applications, of the second frame buffer to the second display device.

5. A system comprising a processing device connected to a plurality of display devices, the processing device comprising:
   a processor;
   a system memory connected to the processor, the system memory comprising a system frame buffer and a second frame buffer, the system frame buffer storing at least background image data, and the second frame buffer storing image data for output to a second display device of the plurality of display devices; and
   a single graphics processing unit connected to the processor, the graphics processing unit comprising a graphics processor and a video memory connected to the graphics processor for storing image data to be output to a first display device of the plurality of display devices, the video memory of the graphics processing unit comprising a primary surface:
   wherein the first display device is directly connected to the graphic processing unit and the second display device is not directly connected to the graphics processing unit, the processing device being configured to:
      copy contents of the system frame buffer onto the primary surface of the video memory,
      render any and all directly rendered applications to be displayed on the second display device onto the primary surface of the video memory,
      copy at least some of the content, including at least some of the rendered applications, of the primary surface to the second frame buffer in the system memory, and
      output at least some of the content, including at least some of the rendered applications, of the second frame buffer to the second display device.

6. A system according to claim 5, and further arranged to lock the primary surface of the video memory, prior to the copying of at least some of the content, including at least some of the rendered applications, of the primary surface of the video memory to the second frame buffer, and unlock the primary surface of the video memory afterwards.

7. A system according to claim 5, and further arranged to run a kernel mode driver in system memory, the kernel mode driver arranged to intercept communications between an operating system and the graphics processing unit.

8. A system according to claim 7, and further arranged to run a user mode helper application in system memory, the user mode helper application connected to the kernel mode driver and arranged to perform the outputting of at least some of the content, including at least some of the rendered applications, of the second frame buffer to the second display device.

* * * * *